(12) United States Patent
Young et al.

(10) Patent No.: US 9,721,682 B2
(45) Date of Patent: Aug. 1, 2017

(54) MANAGING NUCLEAR REACTOR CONTROL RODS

(71) Applicant: NUSCALE POWER, LLC, Corvallis, OR (US)

(72) Inventors: Eric Paul Young, Corvallis, OR (US); Tamas Liszkai, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 587 days.

(21) Appl. No.: 14/182,809

(22) Filed: Feb. 18, 2014

(65) Prior Publication Data

US 2015/0187446 A1 Jul. 2, 2015

Related U.S. Application Data

(60) Provisional application No. 61/922,285, filed on Dec. 31, 2013.

(51) Int. Cl.
*G21C 7/14* (2006.01)
*G21C 1/32* (2006.01)
*G21C 9/02* (2006.01)

(52) U.S. Cl.
CPC ............... *G21C 7/14* (2013.01); *G21C 1/32* (2013.01); *G21C 9/02* (2013.01); *Y02E 30/39* (2013.01)

(58) Field of Classification Search
CPC ... G21C 7/06; G21C 7/08; G21C 7/14; G21C 7/16; G21C 7/20; G21C 19/19
USPC ........................................................ 376/224
See application file for complete search history.

(56) References Cited

U.S. PATENT DOCUMENTS

| | | | | |
|---|---|---|---|---|
| 3,597,939 A | * | 8/1971 | Ripley .................... | G21C 7/10 376/233 |
| 2010/0068464 A1 | * | 3/2010 | Meyer ................ | B23K 15/0086 428/161 |
| 2014/0169514 A1 | * | 6/2014 | Lemm .................... | G21C 7/12 376/203 |
| 2015/0325318 A1 | * | 11/2015 | Singh ..................... | G21C 9/02 376/228 |

* cited by examiner

*Primary Examiner* — Jack W Keith
*Assistant Examiner* — Lily C Garner
(74) *Attorney, Agent, or Firm* — Lowe Graham Jones PLLC

(57) ABSTRACT

A nuclear reactor control rod drive assembly includes a control rod drive mechanism coupled to a drive shaft and operable to bi-directionally urge the drive shaft through a portion of an inner volume of a reactor vessel at a first force; a control rod manifold coupled to the drive shaft; a plurality of control rods coupled to the control rod manifold, the plurality of control rods adjustable among a plurality of positions within the inner volume of the reactor vessel based on operation of the control rod drive mechanism; and at least one variable strength joint positioned between the control rod drive mechanism and the plurality of control rods.

9 Claims, 4 Drawing Sheets

MANAGING NUCLEAR REACTOR CONTROL RODS

CROSS-REFERENCE TO RELATED APPLICATION

This application claims priority under 35 U.S.C. §119 to U.S. Provisional Patent Application Ser. No. 61/922,285, filed Dec. 31, 2013, the entire contents of which are hereby incorporated by reference.

TECHNICAL FIELD

This disclosure generally relates to systems and methods for managing nuclear reactor control rods.

BACKGROUND

Nuclear power reactors rely on neutron absorbing rods to control reactivity. Traditionally, rods are inserted into the reactor core in sets, with a set of rods for each fuel assembly with control rods. The control rods may be moved within the core to control (at least partially) the nuclear fission that occurs in the core. Some reactor designs have a control rod drive mechanism located on one side of a primary system pressure boundary, while the control rods are located on an opposite side of the pressure boundary within the core. Other designs have a drive mechanism be part of the pressure boundary. During normal operation, the rods are positioned within the core by the drive mechanism providing either a force to insert the rods further into the core or a force to remove the control rods from the core. The drive mechanism also may hold the control rods at several different degrees of insertion within the core.

SUMMARY

In a general implementation, a nuclear reactor control rod drive assembly includes a control rod drive mechanism coupled to a drive shaft and operable to bi-directionally urge the drive shaft through a portion of an inner volume of a reactor vessel at a first force; a control rod manifold coupled to the drive shaft; a plurality of control rods coupled to the control rod manifold, the plurality of control rods adjustable among a plurality of positions within the inner volume of the reactor vessel based on operation of the control rod drive mechanism; and at least one variable strength joint positioned between the control rod drive mechanism and the plurality of control rods.

In a first aspect combinable with the general implementation, the variable strength joint includes a failure strength that is greater than the first force and is less than a second force that is greater than the first force and acts on the plurality of control rods due to an abnormal operation event.

In a second aspect combinable with any of the previous aspects, the control rod drive mechanism is positioned external to the reactor vessel.

In a third aspect combinable with any of the previous aspects, wherein a portion of the drive shaft includes the variable strength joint.

In a fourth aspect combinable with any of the previous aspects, the portion of the drive shaft is located at a distal end of the drive shaft that is near the control rod manifold and is opposite a proximal end of the drive shaft that is coupled to the control rod drive mechanism.

In a fifth aspect combinable with any of the previous aspects, the variable strength joint includes at least one of a shear ring, a snap ring, or a reduced diameter portion of the drive shaft.

In a sixth aspect combinable with any of the previous aspects, a portion of at least one of the plurality of control rods includes variable strength joint.

In a seventh aspect combinable with any of the previous aspects, the portion of the at least one control rod is near the control rod manifold.

In an eighth aspect combinable with any of the previous aspects, the variable strength joint includes at least one of a shear ring, a snap ring, or a reduced diameter portion of the drive shaft.

In another general implementation, a method for managing a nuclear control rod ejection event includes moving, with a control rod drive mechanism, a control rod manifold in a first direction and at a first force through a portion of a reactor vessel, the control rod manifold coupled to the control rod drive mechanism with a drive shaft; adjusting a position of a neutron absorption rod in the reactor vessel in the first direction based on the movement of the control rod manifold, the neutron absorption rod coupled to the control rod manifold; receiving, in response to an abnormal operation event, a second force greater than the first force that acts on at least one of the neutron absorption rod, the control rod manifold, or the drive shaft in a second direction opposite the first direction; and in response to receipt of the second force, decoupling at least one of the drive shaft from the control rod manifold or the control rod manifold from the neutron absorption rod with a variable strength joint.

In a first aspect combinable with the general implementation, decoupling at least one of the drive shaft from the control rod manifold or the control rod manifold from the neutron absorption rod with a variable strength joint includes decoupling the drive shaft from the control rod manifold.

In a second aspect combinable with any of the previous aspects, decoupling the drive shaft from the control rod manifold includes at least one of: breaking a snap ring that couples the drive shaft to the control rod manifold; shearing a shear ring that coupled the drive shaft to the control rod manifold; or breaking the drive shaft at a portion of the drive shaft coupled to the control rod manifold.

In a third aspect combinable with any of the previous aspects, decoupling at least one of the drive shaft from the control rod manifold or the control rod manifold from the neutron absorption rod with a variable strength joint includes decoupling the control rod manifold from the neutron absorption rod.

In a fourth aspect combinable with any of the previous aspects, decoupling the control rod manifold from the neutron absorption rod includes at least one of: breaking a snap ring that couples the neutron absorption rod to the control rod manifold; shearing a shear ring that coupled the neutron absorption rod to the control rod manifold; or breaking the neutron absorption rod at a portion of the neutron absorption rod coupled to the control rod manifold.

In a fifth aspect combinable with any of the previous aspects, the second force includes a hydraulic pressure that acts on at least one of: an end of the drive shaft opposite another end of the drive shaft that is coupled to the control rod manifold; or a surface of the control rod manifold that faces the first direction.

In a sixth aspect combinable with any of the previous aspects, the variable strength joint includes a failure strength that is greater than the first force and less than the second force.

In another general implementation, a nuclear reactor control rod drive assembly includes a control rod drive mechanism; a drive shaft coupled to the drive mechanism; and a manifold coupled to the drive shaft with a first connection, the manifold including a second connection to couple a control rod to the manifold. At least one of the first connection or the second connection is a variable strength connection.

In a first aspect combinable with the general implementation, the variable strength connection includes a first failure strength defined in a first direction and a second failure strength defined in a second direction opposite the first direction, the first failure strength greater than the second failure strength.

In a second aspect combinable with any of the previous aspects, the first failure strength is at least an order of magnitude greater than the second failure strength.

In a third aspect combinable with any of the previous aspects, the order of magnitude is at least two.

In a fourth aspect combinable with any of the previous aspects, the variable strength connection includes a shear member that fails at a force in the first direction equal or greater than the first failure strength, and that fails at a force in the second direction equal or greater than the second failure strength.

Various implementations described in this disclosure may include none, one, some, or all of the following features. For example, a nuclear reactor control rod drive assembly according to the present disclosure may help prevent core damage in the case of a control rod ejection event. The control rod drive assembly may also help prevent a breach of a pressure barrier, such as a reactor vessel, during an ejection event. As another example, the control rod drive assembly may prevent or help prevent such events while also providing for normal operational movement of neutron absorption rods during normal (e.g., non-accident) operation of the nuclear reactor system. As yet another example, the control rod drive assembly may prevent or help prevent an additional breach (e.g., in addition to an initial breach that may initiate an ejection event) to a pressure boundary that results from core damage that may occur. For example, the control rod drive assembly, may stop or help stop the insertion of reactivity and core damage. Therefore the additional breach from corium may be prevented.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

The present disclosure describes a nuclear reactor control rod drive assembly that, in some aspects, prevents or helps prevent ejection of a neutron absorption control rod and/or portion of the drive assembly in response to an ejection event. For example, two or more portions of the drive assembly may be coupled together by a variable strength connection or joint that breaks, in response to an ejection force, to prevent or help prevent ejection of the drive assembly portions or control rods.

Figure 1:
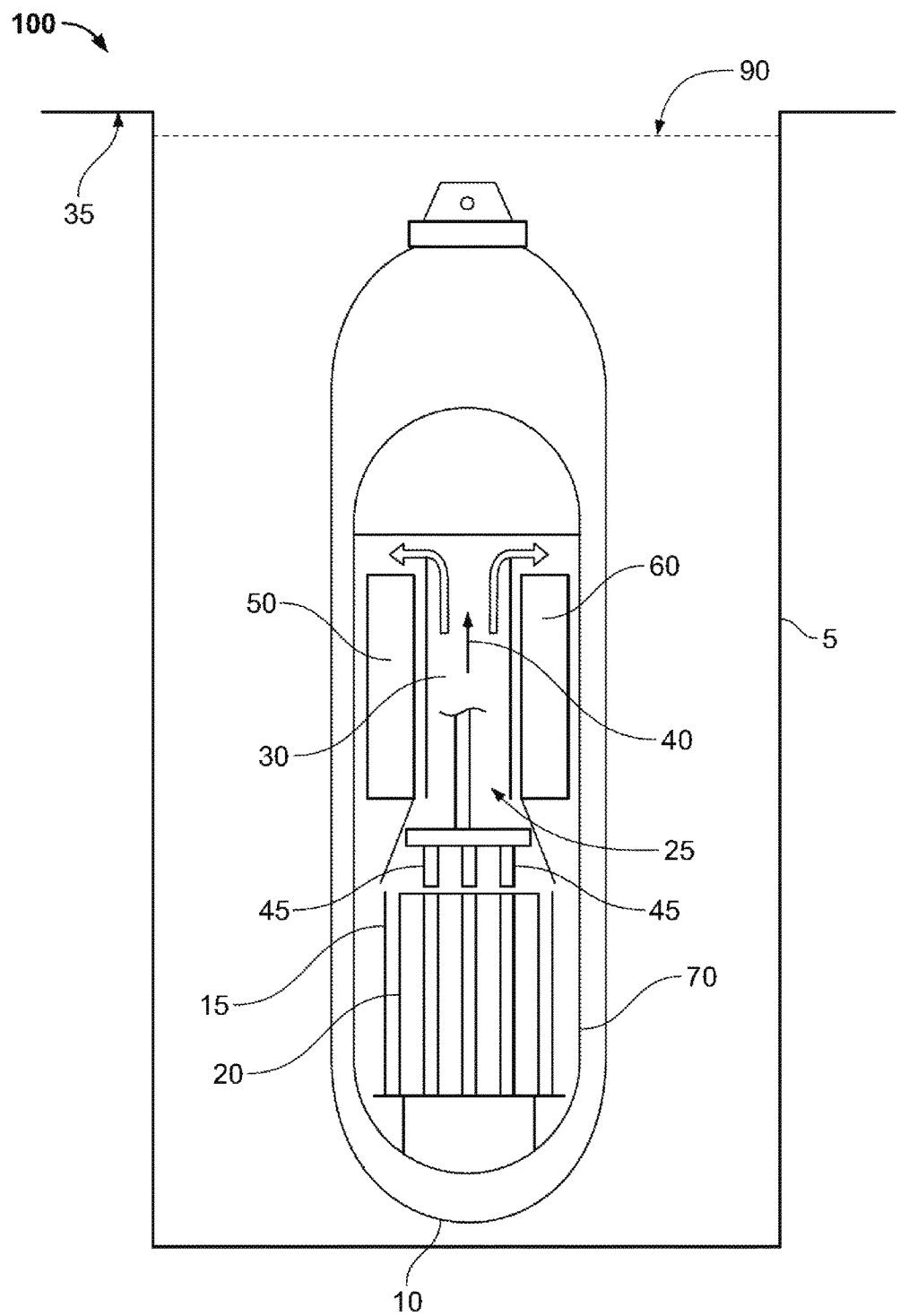
FIG. 1 is a block diagram illustrating an example nuclear reactor system that includes a nuclear reactor control rod drive assembly.

FIG. 1 is a block diagram illustrating a nuclear reactor system 100 (e.g., a nuclear reactor) that includes a nuclear reactor control rod drive assembly 25 (a portion of which is shown in FIG. 1). In some aspects, the nuclear reactor system 100 is a commercial power pressurized water reactor that utilizes circulation (e.g., natural) of a primary coolant to cool a nuclear core and transfer heat from the core to a secondary coolant through one or more heat exchangers. The secondary coolant (e.g., water), once heated (e.g., to steam, superheated steam or otherwise), can drive power generation equipment, such as steam turbines or otherwise, before being condensed and returned to the one or more heat exchangers.

With respect to the nuclear reactor system 100, a reactor core 20 is positioned at a bottom portion of a reactor vessel 70 (e.g., cylinder-shaped or capsule-shaped). Reactor core 20 includes a quantity of nuclear fuel assemblies, or rods (e.g., fissile material that produces, in combination with control rods, a controlled nuclear reaction), and optionally one or more control rods (not shown). In some implementations, nuclear reactor system 100 is designed with passive operating systems (e.g., without a circulation pump for the primary coolant) employing the laws of physics to ensure that safe operation of the nuclear reactor 100 is maintained during normal operation or even in an emergency condition without operator intervention or supervision, at least for some predefined period of time. A containment vessel 10 (e.g., cylinder-shaped or capsule-shaped) surrounds reactor vessel 70 and, in the illustrated example, is partially or completely submerged in a reactor pool, such as below waterline 90 (which may be at or just below a top surface 35 of the bay 5), within reactor bay 5. The volume between reactor vessel 70 and containment vessel 10 may be partially or completely evacuated to reduce heat transfer from reactor vessel 70 to the reactor pool. However, in other implementations, the volume between reactor vessel 70 and containment vessel 10 may be at least partially filled with a gas and/or a liquid that increases heat transfer between the reactor and containment vessels.

In the illustrated implementation, reactor core 20 is submerged within a liquid, such as water, which may include boron or other additives, which rises into channel 30 after making contact with a surface of the reactor core. The upward motion of heated coolant is represented by arrows 40 (e.g., primary coolant 40) within channel 30 (e.g., riser 30). The coolant travels over the top of heat exchangers 50 and 60 and is drawn downward by density difference along the inner walls of reactor vessel 70 thus allowing the coolant to impart heat to heat exchangers 50 and 60. After reaching a bottom portion of the reactor vessel 70, contact with reactor core 20 results in heating the coolant, which again rises through channel 30. Although heat exchangers 50 and 60 are shown as two distinct elements in FIG. 1, heat exchangers 50 and 60 may represent any number of helical (or other shape) coils that wrap around at least a portion of channel 30.

In the illustrated implementation, normal operation of the nuclear reactor module proceeds in a manner wherein heated coolant rises through channel 30 and makes contact with heat exchangers 50 and 60. After contacting heat exchangers 50 and 60, the coolant sinks towards the bottom of reactor vessel 70 in a manner that induces a thermal siphoning process. In the example of FIG. 1, coolant within reactor vessel 70 remains at a pressure above atmospheric pressure, thus allowing the coolant to maintain a high temperature without vaporizing (e.g., boiling).

In the illustrated implementation, as coolant within heat exchangers 50 and 60 increases in temperature, the coolant may begin to boil. As the coolant within heat exchangers 50 and 60 begins to boil, vaporized coolant, such as steam, may be used to drive one or more turbines that convert the thermal potential energy of steam into electrical energy. In the illustrated implementation, after condensing, coolant is returned to locations near the base of heat exchangers 50 and 60.

In the illustrated implementation, a downcomer region between the reflector 15 and the reactor vessel 70 provides a fluid path for the primary coolant 40 flowing in an annulus between the riser 30 and the reactor vessel 70 from a top end of the vessel 70 (e.g., after passing over the heat exchangers 50, 60) and a bottom end of the vessel 70 (e.g., below the core 20). The fluid path channels primary coolant 40 that has yet to be recirculated through the core 20 into convective contact with at least one surface of the reflector 15 in order to cool the reflector 15.

Although a specific example of a nuclear reactor system is shown in FIG. 1, the system 100 may also be any other type of nuclear power system that includes a nuclear reactor core that provides heat, which is utilized to boil water either in a primary coolant loop (e.g., as in a boiling water reactor) or in a secondary cooling loop (e.g., as in a pressurized water reactor). Vaporized coolant, such as steam, may be used to drive one or more turbines that convert the thermal potential energy into electrical energy. After condensing, coolant is then returned to again remove more heat energy from the nuclear reactor core. Thus, nuclear reactor system 100 is one example of any nuclear power system, which may include a control rod drive assembly according to the present disclosure.

Figure 2:
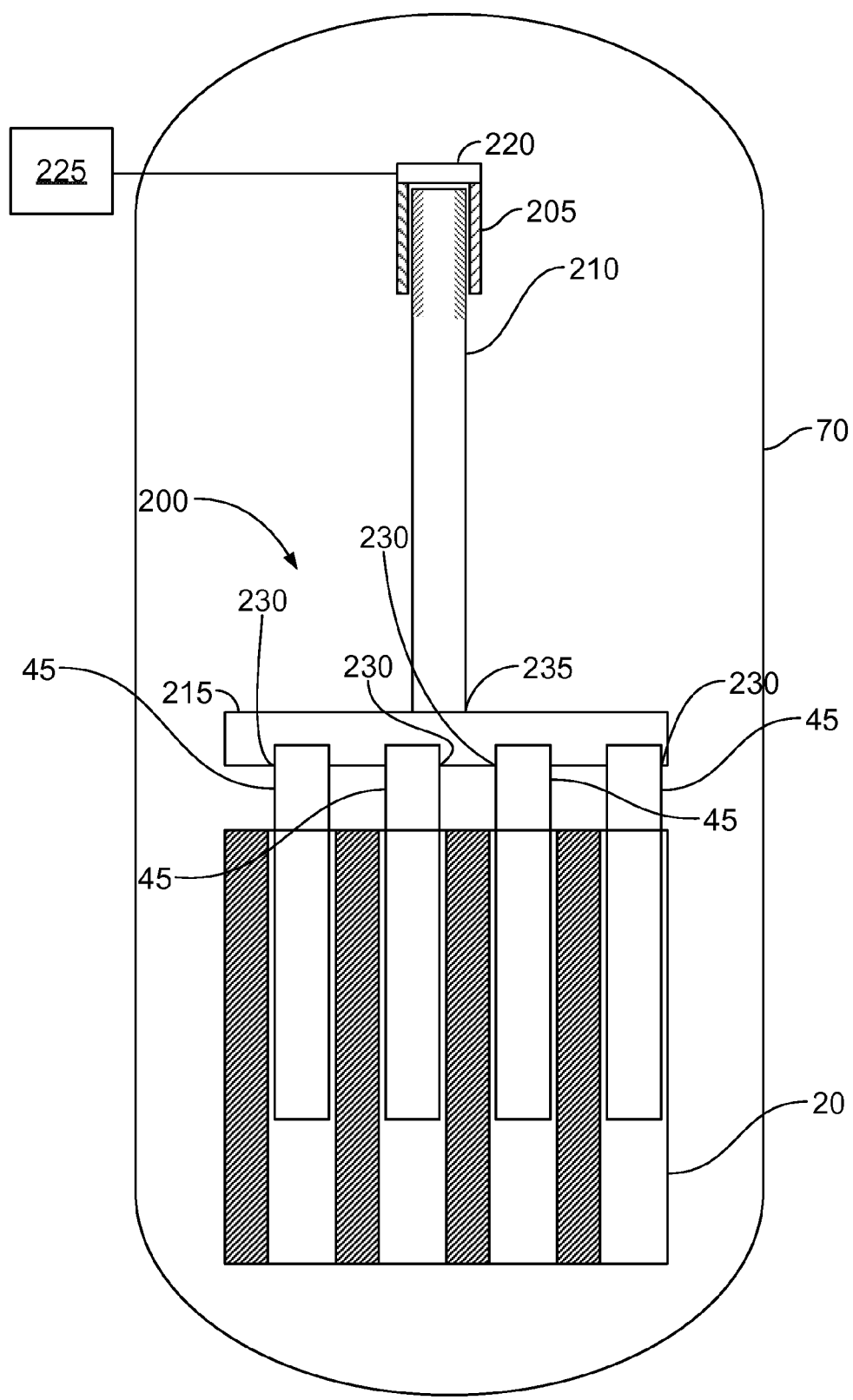
FIG. 2 illustrates an example implementation of a nuclear reactor control rod drive assembly.

The control rod drive assembly 25, a portion of which is shown in FIG. 1, includes a shaft connected to a manifold that holds one or more control rods 45, as illustrated (more detail is shown in FIG. 2). Generally, the control rod drive assembly 25 may adjust (e.g., move) a location of the control rods 45 relative to the core 20 during operation of the nuclear reactor system 100. For example, during normal operation (e.g., not during an accident event), the control rod drive assembly 25 may adjust a location of the control rods 45 within the core to maintain particular temperatures, pressures, or other variables in the system 100.

The control rod drive assembly 25 may also be designed so as to address certain accident events, such as an "ejection" event of the control rods 45. For example, a breach of a pressure boundary (e.g., the reactor vessel 70) may expose surfaces facing in a direction relatively away from the core 20 to a pressure less than the pressure acting on the surfaces facing a relative direction towards the core 70. The difference in pressure provides a motive force to "eject" the control rods 45 from the core 20. This ejection accident typically occurs over a time period shorter than the periods of time over which the control rods 45 are normally inserted or removed from the core 20 by the drive assembly 25. As such, the acceleration of the control rods 45 during an "ejection" accident is greater than during normal operation, and the force applied to the rods 45 for movement during normal operation is less than during the postulated ejection accident scenario. The relatively quick removal of the control rods 45 during the postulated ejection accident may produce an associated quick insertion of reactivity with potential for damage to the core 20.

The illustrated drive assembly 25 may prevent (e.g., or help prevent) an initiating event (e.g., an ejection event) from resulting in removal of the control rods 45 from the core 20 sufficiently so as to prevent or help prevent core damage. The illustrated drive assembly 25 may include a variable strength coupling or connection between, for instance, the control rods 45 and the manifold and/or between the drive shaft and the manifold (as some examples). The variable strength connection or connections may be designed so that the drive assembly 25 and control rods 45 are decoupled (or portions of the drive assembly 25 are decoupled) if an increased removal force is present based on the initiating event. Thus, the drive assembly 25 may positively connect to the control rods 45 for any movement forces similar to those experienced during normal operation, but to disconnect from the control rods 45 under greater forces experienced during an ejection accident event. By disconnecting at such greater forces, the drive assembly 45 may prevent or help prevent an additional breach of a pressure boundary (e.g., the reactor vessel 70) during an ejection event, in addition to preventing or helping to prevent core damage.

In an example analysis of control rod drive assembly 25 during a normal operation (e.g., not in an ejection event), movements of the control rods 45 by the drive assembly 25 may be relatively slow (e.g., as compared to an ejection event) and there may be negligible force due to acceleration on the variable strength connection(s). For example, a normal force on a particular variable strength connection may be only a weight of the drive assembly 25 (and control rods 45 in some aspects). If the drive assembly 25 is considered to be roughly twelve feet in length, an ejection time period of the drive assembly 25 may be, typically, about 160 ms. The calculated force on the variable strength connection(s) may be according to Table 1 (in SI units).

TABLE 1

| Variable | Value |
| --- | --- |
| Control Rod Drive Assembly Mass (typ.) | 38.6 kg |
| Acceleration due to gravity | 9.81 m/s$^2$ |
| Time to ejection | 0.16 sec |
| Starting velocity | 0 m/s |
| Ejection distance (assuming 2 m core length) | 2 m |
| Acceleration due to ejection (velocity/time$^2$) | 156.3 m/s$^2$ |
| Force on Drive Assembly under normal operation (neglecting acceleration additional to gravity) | 38.6 × 9.81 = 379 N |
| Force on Drive Assembly under ejection accident scenario (mass × acceleration) | 38.6 × 156.3 = 6039 N |

The ejection forces on the drive assembly 25, in this example, are much greater than normal operation forces on the drive assembly 25. As illustrated, for instance, the force under the ejection accident scenario is about 16 times that of the force under the normal operation scenario. The variable strength connection(s) may be designed, therefore, to remain intact during normal operation while breaking or shearing during the ejection accident. Unwanted breakage or shearing of the variable strength connection(s) (e.g., during normal operation) is unlikely because the magnitude of the differences in forces acting on the drive assembly 25.

FIG. 2 illustrates an example implementation of a nuclear reactor control rod drive assembly 200, illustrated in a portion of a nuclear reactor system (e.g., nuclear reactor system 100). As illustrated, the control rod drive assembly 200 includes a drive mechanism 205, a drive actuator 220, a drive shaft 210, and a manifold 215. The drive assembly 200, as shown, is illustrated mounted in the reactor vessel 70 and is coupled to control rods 45. The control rods 45, in this figure, are illustrated as inserted, at least partially, into the core 20 of the nuclear reactor system.

In the illustrated embodiment, the actuator 220 of the drive mechanism 205 is communicably coupled to a control system 225. Generally, the control system 225 may receive information (e.g., temperature, pressure, flux, valve status, pump status, or other information) from one or more sensors of the nuclear reactor system 100 and, based on such information, control the actuator 220 to energize the drive mechanism 205. In some implementations, the control system 225 may be a main controller (i.e., processor-based electronic device or other electronic controller) of the nuclear reactor system. For example, the main controller may be a master controller communicably coupled to slave controllers at the respective control valves. In some implementations, the control system 225 may be a Proportional-Integral-Derivative (PID) controller, a ASIC (application specific integrated circuit), microprocessor based controller, or any other appropriate controller. In some implementations, the control system 225 may be all or part of a distributed control system.

The illustrated drive mechanism 205 is coupled (e.g., threadingly) to the drive shaft 210 and operable, in response to operation of the actuator 220, to adjust a location of the control rods 45 in the reactor vessel 70 (e.g., within the core 20) by raising or lowering the manifold 215 on the drive shaft 210. In some aspects, the drive mechanism 205 only controls movement of the drive assembly 200 and control rods 45 during normal operation (e.g., exclusive of an ejection event). Thus, the drive mechanism 205 may slowly move the drive shaft 210 and manifold 215 in relation to movement of the drive assembly 200 during an ejection event (as described above). In the illustrated implementation, actuation of the drive mechanism 205 may apply a force to drive the drive shaft 210 up or down (e.g., away from the core 20 or towards the core 20) to adjust a location of the control rods 45.

In some implementations, the drive mechanism 205 may not apply a positive force to move the drive shaft 210 and manifold 215 but may simply support these components to oppose a downward force of gravity. For example, the control rods 45 may hang from the manifold 215 under their own weight due to gravity. For insertion, the drive mechanism 205 may move the location, or height, at which the manifold 215 is placed and where the associated support to oppose gravity is located. For movement, the mechanism 205 may reduce an amount of force opposing gravity, and there is a net force which inserts the rods 45 into the core 20. For example, a force for insertion of the control rods 45 is gravity for a top mounted drive mechanism 205 (as shown), but may be a positive force opposite to gravity in bottom mounted drive mechanisms (both of which are contemplated by the present disclosure).

The drive shaft 210 is coupled to the manifold 215, that, as illustrated, is coupled to one or more control rods 45. As shown, the drive shaft 210 is coupled to the manifold 215 at a variable strength connection 235. The control rods 45 are also coupled to the manifold 215 at variable strength connections 230. Generally, each variable strength connection (230 and 235) is a joint that is located at a junction of two components of the drive assembly 200. Each joint, in the illustrated implementation, may withstand a force applied thereto during normal operational functions (e.g., operation of the drive mechanism 205 to adjust the manifold 215 location) to securely move the rods 45 in one or more directions without breaking or shearing. Further, each joint, in the illustrated implementation, may not withstand a force applied thereto during an ejection event without breaking or shearing.

In some aspects, a strength of a joint at a variable strength connection (230 or 235) may be directionally-dependent. For example, a variable strength connection (230 or 235) may be designed to withstand a particular force, without breaking, when applied thereto in a particular direction, but may also be designed to withstand a much greater force, without breaking, when applied thereto in an opposite direction. Thus, in one example, a variable strength connection (230 or 235) may have variations in strength in the direction of removal of the control rods 45 (e.g., away from the core 20), but not in the direction of insertion of the control rods 45 (e.g., towards the core 20). This may allow for the weight of the drive shaft 210, or any additional drive force by the drive mechanism 205, to effectively drive the control rods 45 into the core 20 during a reactor trip (e.g., SCRAM event). Thus, the variable strength connection (230 or 235) may not break or shear when driving the rods 45 into the core 20, since the connection has variable strength only in the direction of movement when the drive shaft 210 is removing the rods 45 from the core 20.

Although FIG. 2 shows variable strength connections between the drive shaft 210 and manifold 215 and between the control rods 45 and the manifold 215, in some implementations, there may only be a variable strength connection between the drive shaft 210 and manifold 215. For example, in aspects where there is no variable strength connection between the drive shaft 210 and manifold 215, these components may be rigidly connected (e.g., welding or otherwise). In other aspects, there may only be a variable strength connection between the control rods 45 and manifold 215.

Figure 3A:
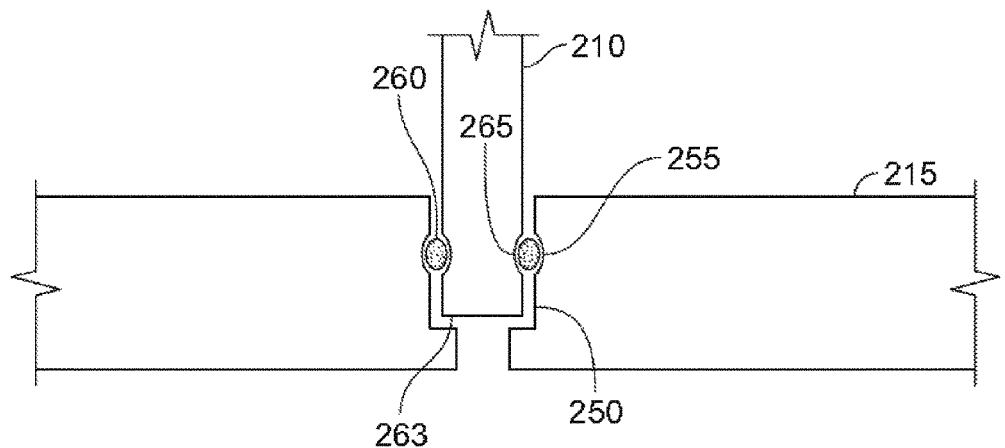
FIGS. 3A-3B illustrate closer views of portions of an example implementation of a nuclear reactor control rod drive assembly.
Figure 3B:
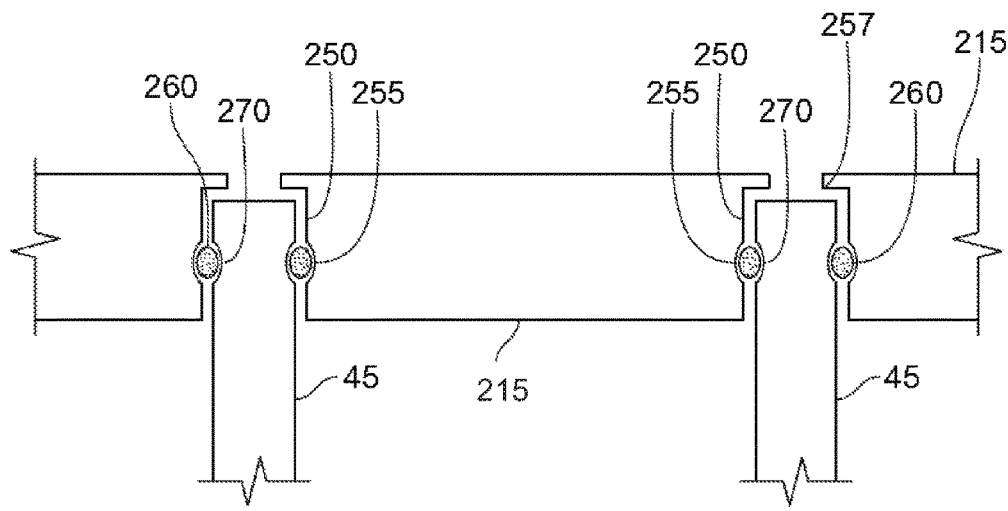

FIGS. 3A-3B illustrate closer views of portions of the example implementation of the nuclear reactor control rod drive assembly 200. FIG. 3A for instance, shows a closer view of the variable strength connection between the drive shaft 210 and the manifold 215. As illustrated, an end of the drive shaft 210 is inserted into a pocket 250 made in the manifold 215. A portion of the drive shaft 210 includes a cutaway 265 (e.g., reduced diameter portion) and the manifold 215 includes a cutaway 255 that define an annular ring into which is positioned a shear member 260. In some aspects, the shear member 260 is a shear ring or snap ring (or an interference fit or other breakable connection), which positively engages the drive shaft 210 to the manifold 215. The shear member 260 and the cutaways 255, 265, in this example, form the variable strength connection between the drive shaft 210 and the manifold 215.

In normal operation, a force (e.g., from the drive mechanism 205) is applied on the drive shaft 210 so that movement is in a downward direction (e.g., towards the core 20) to move the control rods 45 coupled to the manifold 215 into the core 20. During a SCRAM event as well, a force may be applied on the drive shaft 210 in a downward direction (e.g., towards the core 20) to move the control rods 45 coupled to the manifold 215 into the core 20 (e.g., very quickly to stop the event). The force during the SCRAM event may be much greater than the force applied during normal operation. Thus, the variable strength connection between the drive shaft 210 and the manifold 215 may withstand (without breaking or shearing) the force during normal operation and during a SCRAM event when the force is applied in a direction towards the core 20.

In the event of an ejection accident, a force (e.g., a hydraulic force from a coolant in the core 20) is applied to an end 263 of the drive shaft 210 in a direction opposite the core 20. For instance, as shown, an aperture is formed in the manifold 215 adjacent the end 263, thereby defining a fluid pathway for a fluid (e.g., the coolant) to apply pressure to the end 263 of the drive shaft 210. As described above, the force can be much larger than a force applied to the drive shaft 210 during a normal operation. Thus, the variable strength connection between the drive shaft 210 and the manifold 215 may break or shear based on the ejection event force that is applied in a direction opposite the core 20.

FIG. 3B shows a closer view of the variable strength connection between the control rods 45 and the manifold 215. As illustrated, an end of each control rod 45 is inserted into a pocket 250 made in the manifold 215, the pocket terminating in inward-directed flange 257. A portion of the control rod 45 includes a cutaway 270 (e.g., reduced diameter portion) and the manifold 215 includes a cutaway 255 that, together define an annular ring into which is positioned a shear member 260. In some implementations, the shear member 260 is a shear ring or snap ring (or an interference fit or other breakable connection), which positively engages the control rod 45 to the manifold 215. The shear member 260 and the cutaways 255, 270, in this example, form the variable strength connection between the control rod 45 and the manifold 215.

In an example normal operation, a force (e.g., from the drive mechanism 205) may be applied on the drive shaft 210 in a downward direction and transferred to the manifold 215 (and then control rods 45) to move the control rods 45 into the core 20. During the SCRAM event as well, the force is applied on the drive shaft 210, and transmitted through the manifold 215 to the control rods 45, to move the control rods 45 into the core 20 (e.g., very quickly to stop the event). The force during the SCRAM event may be much greater than the force applied during normal operation. Thus, the variable strength connection between the control rods 45 and the manifold 215 may withstand (without breaking or shearing) the force during normal operation and during a SCRAM event when the force is applied in a direction towards the core 20.

In the event of an ejection accident, a force (e.g., a hydraulic force from a coolant in the core 20) is applied to, for example, a bottom surface of the control rods 45 in a direction opposite the core 20, which acts to urge the rods 45 and manifold 215 (and drive shaft 210) upwardly at a high rate of speed. As described above, the force can be much larger than a force applied to the drive shaft 210 during a normal operation. Thus, the variable strength connection between the control rods 45 and the manifold 215 may break or shear based on the ejection event force that is applied in a direction opposite the core 20.

Figure 4:
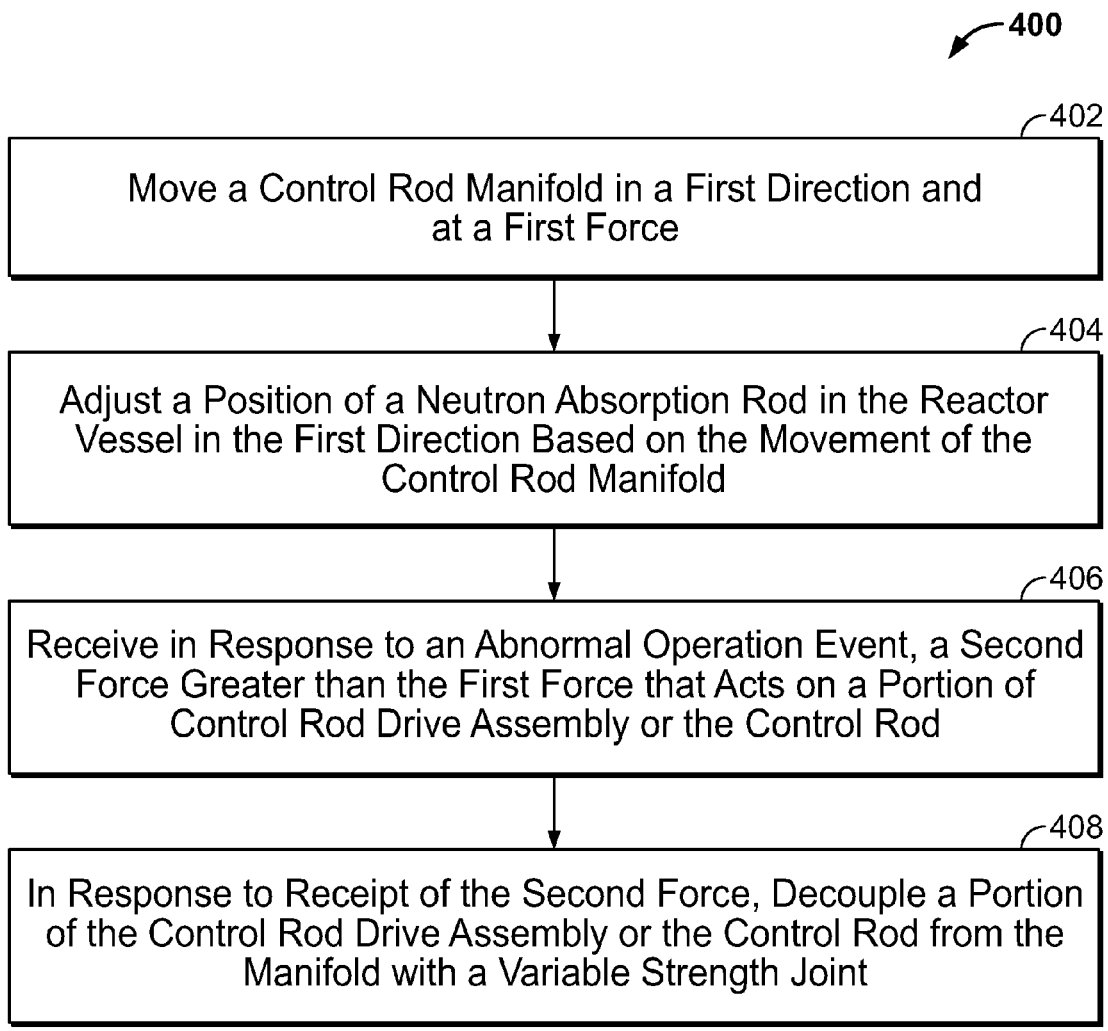
FIG. 4 is a flowchart that describes an example method for managing an ejection event in a nuclear reactor system.

FIG. 4 is a flowchart that describes an example method 400 for managing an ejection event in a nuclear reactor system. Method 400 may be performed with, for example, the nuclear reactor system 100 shown in FIG. 1, which may include the control rod drive assembly 200, or with another suitable nuclear reactor system that includes a control rod drive assembly according to the present disclosure.

In step 402, a control rod manifold is moved (e.g., by a control rod drive mechanism) in a first direction at a first force. In some implementations, the first direction could be towards a core of the nuclear reactor system and the force (and speed) of movement may be relatively negligible (e.g., as compared to an ejection event force). In some implementations, the force in the first direction may be relatively large, such as during a SCRAM event when the control rod manifold is moved relatively quickly (as compared to normal operational movement).

In step 404, a position of a neutron absorption, or control, rod in a reactor vessel of the nuclear reactor system is adjusted in the first direction (e.g., towards the core) based on movement of the control rod manifold. For instance, in some instances, the control rod is coupled to the manifold, which in turn may be coupled to a drive shaft that is coupled to the control rod drive mechanism. In some implementations, of course, the drive mechanism may bidirectionally adjust a position of the control rods during normal operation.

In step 406, in response to an abnormal event (e.g., an ejection event) a second force is received that acts on at least a portion of the control rod guide assembly and/or a control rod or rods. In some implementations, the second force is generated by a hydraulic pressure (e.g., of a coolant that flow through the core) under high pressure. The hydraulic pressure may act on an end (e.g., axial surface) of the drive shaft opposite another end that is within the control assembly near or at a pressure boundary. In some implementations, the hydraulic pressure may act on a bottom surface of the control rod manifold (e.g., a surface that faces the first direction). The hydraulic pressure may act to urge the control rods and drive assembly away from the core. In some implementations, the second force is greater, for instance, at least twice greater, than the first force.

In step 408, in response to the second force, a portion of the control rod drive assembly is decoupled with a variable strength joint that has a failure strength less than the second force. In some implementations, the variable strength joint is positioned between the drive shaft and the manifold.

Once the variable strength joint fails in response to the second force, portions of the drive assembly and/or the control rods may remain within the core rather than being ejected from the core. In some implementations, the variable strength joint is positioned between the control rod and the manifold. In some implementations, the variable strength is positioned between the drive shaft and the drive mechanism.

In some implementations, the variable strength joint may include a snap ring (or other breakable connection). The variable strength joint may also include a shear ring. Decoupling at the variable strength joint may include, for instance, breaking the snap ring or shearing the shear ring to decouple the portions of the drive assembly. Other variable strength joints may include, for example, a shear pin that can break at the second strength or a reduced dimension or failure portion.

The use of terminology such as "front," "back," "top," "bottom," "over," "above," and "below" throughout the specification and claims is for describing the relative positions of various components of the system and other elements described herein. Similarly, the use of any horizontal or vertical terms to describe elements is for describing relative orientations of the various components of the system and other elements described herein. Unless otherwise stated explicitly, the use of such terminology does not imply a particular position or orientation of the system or any other components relative to the direction of the Earth gravitational force, or the Earth ground surface, or other particular position or orientation that the system other elements may be placed in during operation, manufacturing, and transportation.

A number of implementations have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. Accordingly, other implementations are within the scope of the following claims.

What is claimed is:

1. A nuclear reactor control rod drive assembly, comprising:
   a control rod drive mechanism coupled to a drive shaft and operable to urge the drive shaft through a portion of an inner volume of a reactor vessel in a first direction toward a reactor core and in a second direction away from the reactor core;
   a control rod manifold coupled to the drive shaft;
   a plurality of control rods coupled to the control rod manifold, the plurality of control rods adjustable among a plurality of positions within the inner volume of the reactor vessel based on operation of the control rod drive mechanism; and
   at least one joint positioned between the control rod drive mechanism and the plurality of control rods, the at least one joint having a first failure strength in the first direction and a second failure strength in the second direction, the first failure strength being greater than the second failure strength,
   wherein the joint comprises a plurality of joints, the plurality of joints connecting the control rod manifold and the plurality of control rods, wherein the plurality of joints provide the first failure strength and the second failure strength between the manifold and the plurality of control rods,
   wherein the manifold further comprises a plurality of pockets, the plurality of control rods being positioned in the plurality of pockets, and
   wherein each of the plurality of pockets is formed with an inward-directed flange.

2. The nuclear reactor control rod drive assembly of claim 1, wherein the control rod drive mechanism is positioned external to the reactor vessel.

3. The nuclear reactor control rod drive assembly of claim 1, wherein a portion of the drive shaft comprises the joint.

4. The nuclear reactor control rod drive assembly of claim 3, wherein the portion of the drive shaft is located at a distal end of the drive shall, that is near the control rod manifold and is opposite a proximal end of the drive shaft that is coupled to the control rod drive mechanism.

5. The nuclear reactor control rod drive assembly of claim 4, wherein the joint comprises an annular member housed within a reduced diameter portion of the drive shaft.

6. The nuclear reactor control rod drive assembly of claim 4, further comprising an aperture formed in the manifold adjacent the distal end of the drive shaft, the aperture defining a fluid pathway for fluid to apply pressure through the manifold and to the distal end of the drive shaft when the drive shaft is connected to the manifold.

7. A nuclear reactor control rod drive assembly, comprising:
   a control rod drive mechanism;
   a drive shaft coupled to the drive mechanism, the drive mechanism operable to move the drive shaft in a first direction toward a reactor core and in a second direction away from the reactor core; and
   a manifold coupled to the drive shaft with a first connection, the manifold comprising a second connection to couple a control rod to the manifold,
   wherein at least one of the first connection or the second connection further comprises a first failure strength in the first direction and a second failure strength in the second direction, the first failure strength being greater than the second failure strength,
   wherein the second connection comprises a cutaway section formed in the control rod, and
   wherein the cutaway section is received within a pocket formed in the manifold.

8. The nuclear reactor control rod drive assembly of claim 7, wherein the pocket further comprises an additional cutaway section, a shear member being trapped between the cutaway section and the additional cutaway section.

9. The nuclear reactor control rod drive assembly of claim 7, the pocket further terminating in an inward-directed flange.

* * * * *